United States Patent [19]

Griepentrog et al.

[11] Patent Number: 4,575,759
[45] Date of Patent: Mar. 11, 1986

[54] COMPONENT VIDEO INTERCONNECTION APPARATUS

[75] Inventors: Dal F. Griepentrog; William A. Lagoni, both of Indianapolis, Ind.

[73] Assignee: RCA Corporation, Princeton, N.J.

[21] Appl. No.: 508,502

[22] Filed: Jun. 28, 1983

[51] Int. Cl.[4] .......................................... H04N 5/268
[52] U.S. Cl. .................................................. 358/181
[58] Field of Search ................... 358/181, 194, 86, 93, 358/185, 310, 335; 455/3, 133, 140

[56] References Cited

U.S. PATENT DOCUMENTS

| | | | |
|---|---|---|---|
| 4,276,562 | 6/1981 | Stewart | 358/181 |
| 4,337,480 | 6/1982 | Bourassin et al. | 358/93 |
| 4,338,632 | 7/1982 | Falater | 358/194 |
| 4,400,735 | 8/1983 | Strammello, Jr. | 358/181 |
| 4,456,928 | 6/1984 | Guillon et al. | 358/181 |
| 4,502,026 | 2/1985 | Imazeki | 358/181 |

FOREIGN PATENT DOCUMENTS 53-121601 10/1978 Japan .
2072407 9/1981 United Kingdom .

OTHER PUBLICATIONS

Radio Shack, Video Selector, Cat. No. 15-1261, 1983 catalog.
Page 13 of the RCA Selectavision Video Disc Player SGT 250 Owner's Manual, published by RCA Corporation in 1982.
RCA Service Data for Selectavision Video Disc Player Model SFT 100, published by RCA Corporation in 1981 (pp. 5-9).
RCA Service Data for Video Cassette Recorder Model TDP 1000, published by RCA Corporation in 1980 (pp. 7-49 and 7-54).
Article entitled "Component Television" by Telka S. Perry published in IEEE Spectrum Jun. 1983, pp. 38 to 43.
Instructions for TS-2B Video-Audio Switcher, IB 31181, published 1965 by RCA Corporation, Camden, N.J.

Primary Examiner—Tommy P. Chin
Attorney, Agent, or Firm—Eugene M. Whitacre; Peter M. Emanuel; Lawrence C. Edelman

[57] ABSTRACT

Apparatus for interconnecting a component entertainment system including a bi-directional signal bus for interconnecting some of the components comprises a first switch unit having one input adapted to be coupled to the bi-directional signal bus, at least one other input adapted to be coupled to receive signal from a component not connected to the signal bus and a common output. A second switch unit has one input adapted to receive signal from the component not connected to the signal bus. A signal driver has its input coupled to the output of the second switch unit and its output coupled to the input of the first switch unit adapted to be coupled to the signal bus. The output impedance of the signal driver serves to terminate the signal bus in its characteristic impedance when the driver does not supply signal at its output.

6 Claims, 2 Drawing Figures

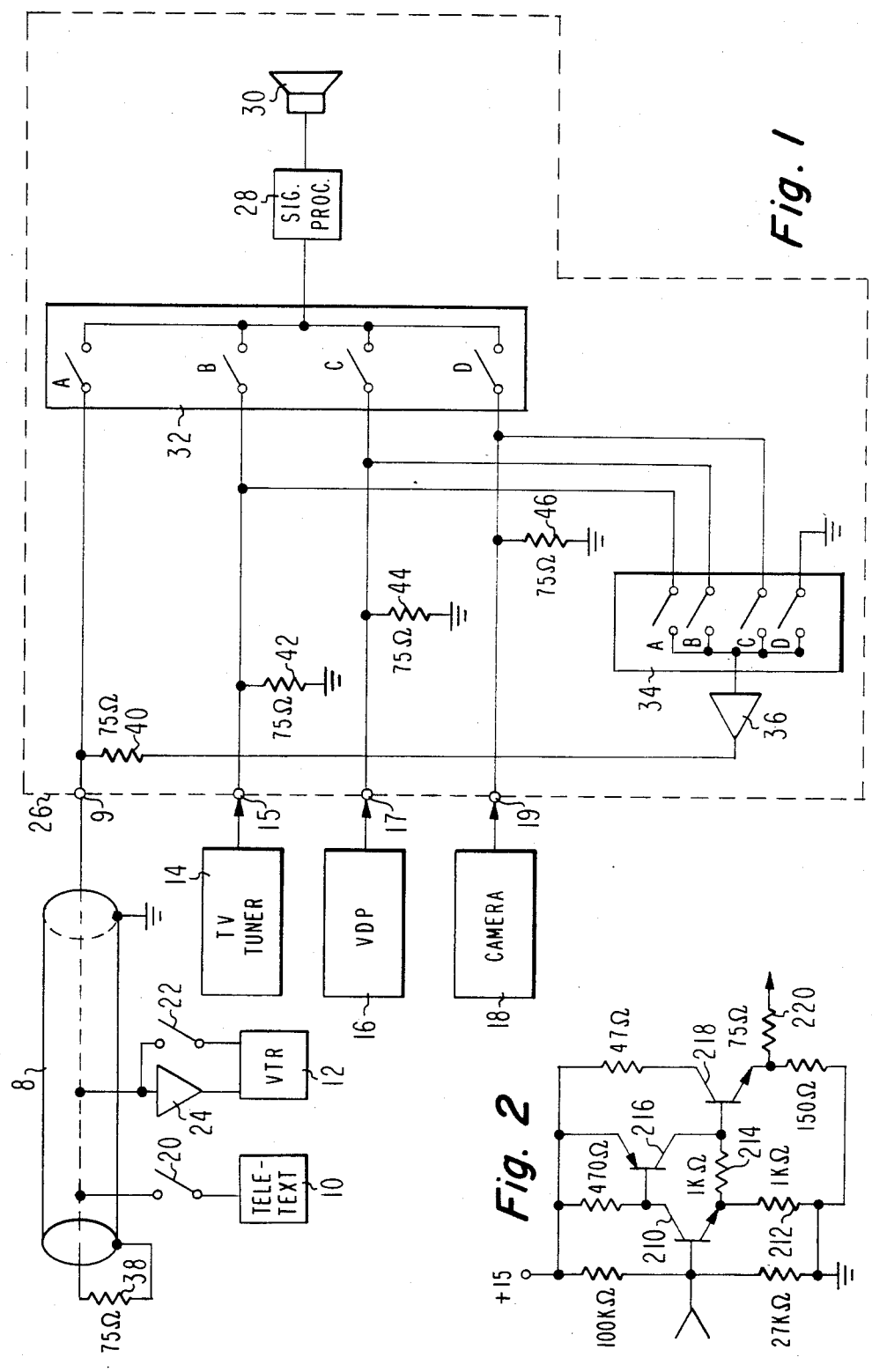

COMPONENT VIDEO INTERCONNECTION APPARATUS

FIELD OF THE INVENTION

The present invention relates to an interconnection apparatus for a component video system and more particularly to a switch arrangement for selectively distributing video signal among a plurality of video components, at least one of which includes a bi-directional video signal bus.

BACKGROUND OF THE INVENTION

With the increased popularity of various home entertainment video components, such as video disc and tape players, teletext, home computers and satelite TV receivers, etc., the interconnection of these components has become more complex.

U.S. patent application Ser. No. 508,605 entitled A DISTRIBUTED SWITCHED COMPONENT AUDIO/VIDEO SYSTEM, filed concurrently with the present application in the name of B. W. Beyers, Jr., herein incorporated by reference, describes an audio/video component interconnection system including a bi-directional video signal bus for transferring video signal in a serial manner among the video components. The video components are connected at distributed locations along the video bus and are responsive to remote control signals transmitted along a control bus for selectively transmitting and/or receiving a video signal to or from the video bus. This distributed switched type of interconnection system is relatively easy for the user to set-up and control and flexible enough to easily allow for future system expansion by simple connection for subsequently added components.

It is herein recognized, however, that the user of such a distributed switched system may also possess video components which are not compatible with the bi-directional video bus system, i.e., they may not be of the type described in the aforenoted Beyers application which are capable of selectively transmitting or receiving video signal in response to the systems control signals. It is desirable to provide a relatively simple interconnection arrangement for interconnecting video components which are compatible with a bi-directional bus system (distributed components) with individual components (non-distributed).

SUMMARY OF THE INVENTION

In accordance with the principles of the present invention, a first switch unit having a plurality of inputs and a common output has one input coupled to receive video signals from the distributed components connected to the bi-directional video signal bus and at least one other input coupled to receive video signal from at least one non-distributed component. A second switch unit having at least one input and a common output has an input coupled to receive a video signal from the non-distributed video component. A video signal driver is coupled between the common output of the second switch and the bi-directional video signal bus and has an output impedance, even when not supplying video signal to the bus, corresponding substantially to the characteristic impedance of the bi-directional video signal bus, so as to terminate the bus in its characteristic impedance.

BRIEF DESCRIPTION OF THE DRAWING

FIG. 1 illustrates partially in block diagram form and partially in schematic diagram form a video component interconnection arrangement constructed in accordance with the principles of the invention; and FIG. 2 illustrates in schematic diagram form details of a portion of FIG. 1.

DESCRIPTION OF THE PREFERRED EMBODIMENTS

Referring to FIG. 1, a plurality of video components are shown. Components 10 and 12 are distributed since they are directly coupled to a bi-directional video signal bus 8 at distributed locations along bus 8. Bus 8 is coupled to an input 9 of a television (TV) monitor 26 (shown in dashed lines). Video signal bus 8 may comprise, for example, a 75 ohm coaxial cable. Components 14, 16 and 18 are not distributed since they are not directly coupled to bus 8 but rather are directly coupled to respective input terminals 15, 17 and 19 of monitor 26. By way of example, components 10-18 correspond to a teletext decoder, video tape recorder (VTR), TV tuner, video disc player (VDP) and a video camera, respectively, each supplying a baseband video signal at its respective video signal output.

The distributed components 10 and 12 include video signal switches 20 and 22, respectively, for selectively transferring video signals from their outputs to bus 8. These switches can be manually controlled or remotely controlled as described in the aforenoted Beyers application. Additionally, a high input impedance video signal buffer 24 supplies video signal from bus 8 to a record input of VTR 12. Television monitor 26 includes a signal processing circuit 28 of conventional design for applying the video signal from one of components 10-18 to a kinescope 30 for display.

In accordance with the principles of the present invention an interconnection arrangement includes a first switch unit 32 for selectively applying video signals from distributed components 10 or 12 via bi-directional bus 8 or from one of the non-distributed components 14-18, to the signal processing circuit 28. A second switch 34 selectively couples video signals from one of the non-distributed components to bus 8 via a video signal driver 36. Driver 36 has an output impedance corresponding substantially to the characteristic impedance of the bi-directional bus 8 for terminating bus 8 in its characteristic impedance when bi-directional bus 8 is supplying video signal to the TV monitor 26.

More specifically, switch unit 32 includes four independently operable switches A, B, C and D, having inputs coupled to input terminals 9, 15, 17 and 19 of TV monitor 26 to receive respective video signals from bi-directional bus 8, TV tuner 14, VDP 16 and video camera 18. The output of switches A-D of switch unit 32 are coupled in common for supplying the video signal received through one of switches A-D to signal processing circuit 28.

A switch unit 34 includes four independently operable switches A, B, C and D. Switches A-C have inputs coupled to input terminals 15, 17 and 19 of TV monitor 26 to receive respective video signal from TV tuner 14, VDP 16 and video camera 18. Switch D has an input coupled to signal ground reference voltage. The outputs of switches A-D of switch unit 34 are coupled in common to the input of video signal driver 36 for supplying a selected one of the video signals to bi-directional bus 8 in order that a video signal from one of the non-distributed components 14, 16 or 18 can be recorded using the VTR 12.

Since the frequency range of baseband video signals is substantial, i.e., extending approximately 4 MHz, the ends of bi-directional bus 8 should be terminated in its characteristic impedance (e.g., 75 ohms) in order to minimize video signal reflections which would otherwise manifest themselves as ghosts in the reproduced image. One end of bus 8 includes a 75 ohm resistor 38 coupled between the center conductor of bus 8 and its outer shield, which is grounded. The other end of bus 8 is terminated in its characteristic impedance by video signal driver 36. Driver 36 has a 75 ohm output impedance (represented by a resister 40). When video signal is to be received by monitor 26 from bus 8, switch D of unit 34 is closed so as to couple signal ground to the input of driver 36.

In this condition, driver 36 maintains its 75 ohm output impedance and advantageously serves as the characteristic impedance termination for the end of bus 8 connected to monitor 26. Since its input is grounded, driver 36 is prevented from introducing spurious signal onto bus 8. Additionally, 75 ohm resistors 42, 44 and 46 are included in TV monitor 26 for providing proper impedance termination for video components 14, 16 and 18 at respective input terminals 15, 17 and 19 of TV monitor 26.

Furthermore, an audio signal bus (not shown) could be used to supply audio signals from distributed video components 10 and 12 (or other audio components, not shown) and non-distributed components 14, 16 and 18 may also supply audio signals. An interconnection arrangement similar to switches 32 and 34 could be used to couple the audio signals from the audio bus or the non-distributed components 14-18 to TV monitor 26 for reproducing a sound program in conjunction with the reproduced image. The reader is referred to the aforenoted U.S. patent application of B. W. Beyers for further details of a distributed switched component audio system.

Switches A-D of switch units 32 and 34 may be physically located on one side of TV monitor 26, in which case the user can manually operate the switches for controlling the routing of the video signals. The described switching arrangement advantageously allows several of the video components to operate and be interconnected simultaneously. For example, although a user may view a video disc on kinescope 30 by closing switch C of switch unit 32, he does not have to miss a TV program presently being broadcast. In this case, the user may also close switch A of switch unit 34, in order to couple video signal from TV tuner 14 to bus 8 where it can be recorded by VTR 12 for subsequent viewing. Appropriate ones of audio switches (not shown) would also be closed for proper routing of the coresponding audio signals.

The circuitry of FIG. 2 is suitable for constructing driver 36 or buffer 24. Video signal from either bus 8 or the output of switch 34 is applied by emitter follower transistor 210 to the junction of equal valued resistors 212 and 214. An opposite conductivity type transistor 216 clamps the voltage at the collector of transistor 210 to approximately 1 $V_{be}$ below 15 volts for stablizing its operation with respect to temperature variations. The video signal level at the junction of resistors 212 and 214 is substantially equal to the video signal level at the base of transistor 210 due to its emitter follower operation.

Since resistors 212 and 214 are of equal value, the signal level at the junction of resistor 214 and the base of an output transistor 218 is twice the input video signal level. Output transistor 218 includes a 75 ohm resistor 220 having one end connected at its emitter for supplying the video signal. When the circuitry of FIG. 2 is used for providing video signal driver 36 of FIG. 1, 75 ohm resistor 220 corresponds to 75 ohm resistor 40. Since the 75 ohm output impedance of the driver reduces the amplitude of the video signal by 50% when driving a 75 ohm load, the amplifier arrangement of FIG. 2 has a gain of 2, due to resistors 212 and 214.

While the invention has been illustrated in terms of a particular switching arrangement, it is to be understood that other switching arrangements could be used for interconnecting the video components in accordance with the principles of the invention. For example, driver 36 will maintain its 75 ohm output impedance regardless of the closing of switch D of switch unit 34 and thus, switch D is not essential. However, in the present example, switch D is desirable since it prevents spurious signals from being coupled to bus 8 by driver 36 when driver 36 is terminating bus 8 in its characteristic impedance. Additionally, it is also to be understood that the impedance required for effectively reducing a signal reflection from the monitor end of video bus 8 is not required to be exactly equal to the characteristic impedance, such as shown in FIG. 1. These and other modifications are intended to be within the scope of the present invention defined by the following claims.

What is claimed is:

1. Interconnection apparatus for transferring signals between various components, comprising:
   first switch means having a plurality of selectively conductive signal paths having individual inputs and a common output, one of said inputs adapted to be coupled to a bi-directional signal bus connected to at least one of said components and at least one other of said inputs adapted to be coupled to at least one other of said components;
   second switch means having a plurality of selectively conductive signal paths having individual inputs and a common output, one of said inputs adapted to be coupled to said other one of said components; and
   a signal driver having an input coupled to said common output of said second switch means and an output coupled to said input of said first switch means adapted to be coupled to said signal bus, said output having an impedance corresponding substantially to the characteristic impedance of said signal bus when supplying signal and substantially maintaining said characteristic output impedance when not supplying signal.

2. The apparatus recited in claim 1 wherein said signals transferred by said interconnection apparatus correspond to video signals and said driver maintains said output impedance when said bi-directional signal bus transfers video signal to said first switch means, so as to terminate said signal bus in its characteristic impedance.

3. The apparatus recited in claim 2 wherein said second switch means has a second input adapted to be coupled to a reference potential.

4. The apparatus recited in claim 3 wherein said second switch means couples said reference potential to the input of said driver so as to cause said driver to not supply video signal to said bus while maintaining said characteristic output impedance.

5. The apparatus recited in claim 2 wherein said output of said first switch means is coupled to a video signal processing circuit.

6. The appartus recited in claim 5 wherein said first and second switch means, signal driver and video signal processing circuit are all enclosed in a television monitor.

* * * * *